Feb. 28, 1961   C. E. BEATY   2,973,053
TRESTLE LEG CONNECTING UNIT
Filed Jan. 3, 1957
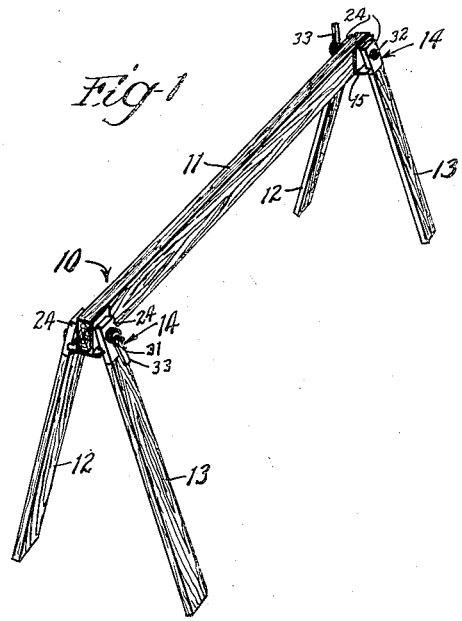
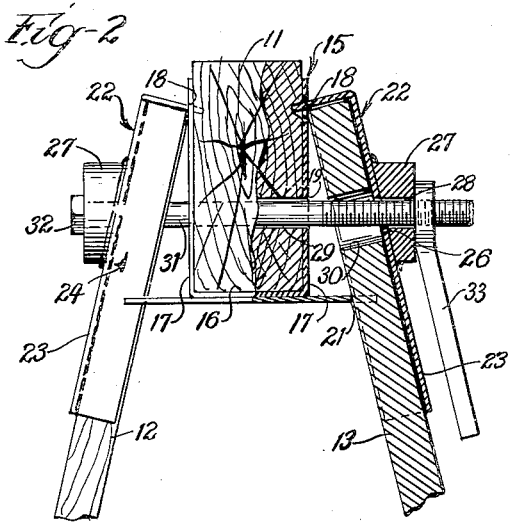
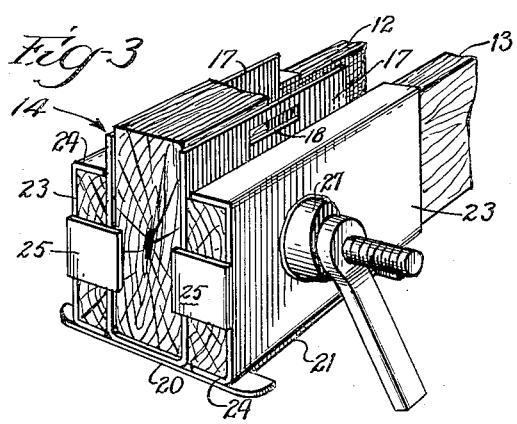
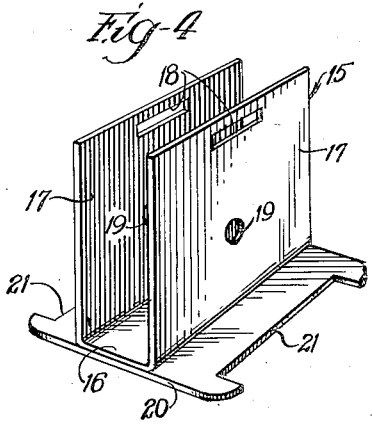
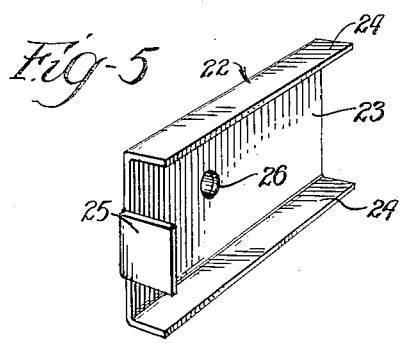
INVENTOR.
Clarence E. Beaty
BY
Cromwell, Greist + Warden
Attys.

United States Patent Office 2,973,053
Patented Feb. 28, 1961

2,973,053

TRESTLE LEG CONNECTING UNIT

Clarence E. Beaty, Urbana, Ill., assignor to Harrison Cropsaver Co., Champaign, Ill., a corporation of Illinois Filed Jan. 3, 1957, Ser. No. 632,330

4 Claims. (Cl. 182—155)

The present invention is directed to a new and improved form of leg connecting unit particularly adapted for use in attaching supporting legs to cross members to form trestles or sawhorses, the cooperating elements defining the leg connecting unit functioning to rigidly fix the supporting legs relative to the cross member of the trestle in its erected condition while further being adjustable to allow collapsing or folding of the trestle for storage purposes without the necessity of disconnecting any of the parts of the trestle or its leg connecting units.

It is an object of the present invention to provide a new and improved form of leg connecting unit for use in the fabrication of a trestle or sawhorse, the leg connecting unit including elements which are fixable and movable relative to one another to allow the folding of the legs of the trestle into parallel side-by-side relation with the cross member of the same without disassembly of the structural elements of the trestle or the elements forming the leg connecting units.

A further object is to provide a new and improved form of leg connecting unit for use in the fabrication of a trestle, the leg connecting unit being formed primarily from three separable elements two of which are of identical design and structural arrangement, all of the elements being readily and inexpensively formed to thus provide a low cost trestle structure the supporting legs of which may be easily and readily moved into folded storage relation with the cross member of the same without undue manipulation of the leg connecting units and without detachment of any of the elements of the leg connecting units or of the legs themselves.

Still another object taken in conjunction with the foregoing is to provide a new and improved trestle leg connecting unit which utilizes features of design providing the supporting leg structures with a high degree of resistance to movement relative to the cross member of the trestle when the same is in its erected condition and being subjected to heavy loads or working forces, the leg connecting units further being readily adjustable without disassembly to provide convenient folding or movement of the supporting leg structures into parallel, side-by-side relation with the cross member of the trestle for convenient storage or shipment, the leg connecting unit being readily attached to the cross member and leg supporting structures forming the trestle without the necessity of using special tools or fabricating equipment.

Other objects not specifically set forth will become apparent from the following detailed description made in conjunction with the drawings wherein:

Fig. 1 is a perspective of an erected trestle using the leg connecting units of the present invention;

Fig. 2 is an enlarged fragmentary end view of the erected trestle of Fig. 1 having portions thereof in section;

Fig. 3 is a fragmentary perspective of an end portion of the trestle and its associated leg connecting unit illustrating the folding of the legs of the trestle into parallel side-by-side relation with the cross member thereof for storage purposes;

Fig. 4 is a perspective of one of the elements forming the leg connecting unit of the present invention; and Fig. 5 is a perspective of another form of element forming a part of the leg connecting unit of the present invention.

In Fig. 1 a known type of trestle or sawhorse 10 is illustrated as being formed from a cross member 11 normally fabricated from wood such as a section of a two-by-four. Adjacent each of the ends of the cross member 11 are connected a pair of downwardly depending leg members 12 and 13 each of which is generally formed from wood such as being cut sections of a one-by-four An improved form of leg connecting unit generally designated by the numeral 14 attaches the pairs of legs 12 and 13 to each end of the cross member 11 in such a manner as to provide sturdy and rugged support to the cross member 11 when the trestle 10 is in its erected condition while at the same time allowing the legs 12 and 13 of each pair to be moved about pivot points defined by the leg connecting units 14 into parallel side-by-side relation with the cross member 11.

In Fig. 2 one of the leg connecting units 14 is illustrated in detail, it being understood that the other leg connecting unit 14 shown in Fig. 1 is formed in exactly the same manner. Still further, it should be understood that any number of leg connecting units can be used with the cross member 11 depending upon the number of pairs of legs required for the particular use of the trestle 10. Each leg connecting unit 14 includes a channel shaped member 15 which, as particularly shown in Fig. 4, is formed from a one-piece, generally U-shaped body portion defining a horizontal bottom plate 16 integrally connected along its side margins with upstanding, transversely spaced side plates 17. Near the top margins of each of the side plates 17 is transverse slot 18 cut from the material thereof. Toward the lower central portions of the plates 17 are aligned drilled holes 19, the slots 18 and holes 19 being provided for a purpose to be described. The bottom surface of the bottom plate 16 has attached thereto a horizontal plate 20 which may be fixed to the bottom plate 16 by any suitable means such as welding. The opposite side margins of the plate 20 are recessed to define oppositely and outwardly opening grooves 21 to thus provide grooved locking means forming a part of the channel 15.

Referring again to Fig. 2, another element of the leg connecting unit 14 is a leg connecting member generally designated by the numeral 22. It will be noted that two leg connecting or leg holding members 22 are used in forming a single leg connecting unit 14. Each of the members 22 is identical in construction and for the purposes of specifically describing their structural details, reference is made to Fig. 5 wherein one of these members is illustrated. The leg holding member or plate 22 is generally U-shaped being formed from a flat outer central plate portion 23 integrally formed along opposite side margins thereof with inwardly turned flanges 24. The top marginal edge of the central plate portion 23, or the foremost edge as viewed in Fig. 5, has integrally formed therewith an inwardly directed tongue 25 which extends inwardly beyond the inward extension of the side flanges 24. The upper central portion of the center plate 23 is provided with a drilled hole 26.

The assembled elements of the leg connecting unit are shown in Fig. 2 and it is illustrated therein that a portion of the cross member 11 is received within the channel member 15 between the side plates 17 thereof and in engagement with the top surface of the bottom plate 16. The upper ends of the legs 12 and 13 are each intimately received within a leg connecting member 22 and the top radial edge surface of each leg 12 and 13 is in abutment or close association with the inner surface of the tongue 25 of its attaching leg holding member 22. As particularly shown in Fig. 3, the side flanges 24 of each leg holding member 22 are in engagement with the side surfaces of the leg 12 or 13 held thereby. The end portions of the tongues 25 are received within their associated slots 18 while the outer surfaces of the paired flanges 24 are received within the confines of their associated groove 21. With the positioning of the grooves 21 substantially outwardly of the side plate 17, each of the legs 12 and 13 and associated leg holding plates 22 are inclined outwardly and downwardly relative to the cross member 11. This arrangement, of course, provides the assembled trestle 10 with the requisite stability.

The outer surfaces of the center plate portions 23 of the leg holding plates 22 are provided with bosses 27 having drilled openings 28 therein which communicate with the drilled holes 26 associated therewith. The bores 28 and holes 26 are further aligned with the holes in the channel member 15 and the cross member 11 as well, as each of the legs 12 and 13 are suitably drilled to provide a continuous annular passageway or opening through the entire assembly. The drilled opening of the cross member 11 is designated by the numeral 29 in Fig. 2 whereas the drilled opening in each of the legs 12 and 13 is designated by the numeral 30. It will be noted that the opening 30 is of greater diameter than the other aligned openings to compensate for the angular positioning of the legs 12 and 13 relative to the continuous passageway defined by the other openings.

Passing through the aligned openings is a bolt 31 which at one end is provided with a head 32 abutting the outer surface of a boss 27 as shown in Fig. 2. The other end of the bolt 31 is suitably threaded and receives thereon a tightening lever 33 having complementary threads allowing the same to be threadedly advanced or retracted along the threaded end of the bolt 31. The bolt engaging portion of the lever 33 is designed to abut the outer face of the remaining boss 27 to allow complete tightening of the over-all assembly when the desired positioning of the legs 12 and 13 has been achieved. In the erected condition as shown in Fig. 2, the adjustable fastening and tightening means defined by the bolt 31 and lever 33 tightly holds the legs 12 and 13 and associated connecting plates 22 in association with the channel member 15. Thus the tongues 25 are tightly held within their associated slots 18 and, in fact, can be imbedded or forced into the material of the cross member 11 as shown in Fig. 2. As to whether or not the ends of the tongues 25 are actually imbedded in the material of the cross member 11 depends upon the effective length of the same and in order for the connecting unit 14 to function properly it is necessary merely to have the tongues 25 received within the slots 18. The adjustable tightening means further tightly holds the legs 12 and 13 within their associated grooves 21 to thus fixedly pitch each of the legs 12 and 13 in downwardly divergent relation relative to the cross member 11.

With the arrangement described, the legs 12 and 13 in their erected condition are prevented from pivoting about the bolt 31 into collapsing condition by the locking effect established by the tongues 25 and slots 18 and the outwardly directed ends of the grooves 21. In this manner the legs 12 and 13 are supported against rotation about the bolt 31 at points both above and below the bolt 31. The horizontal plate 20 thus functions to prevent collapsing of the legs 12 and 13 while holding the same away from the bottom portion of the channel member 15 to provide the necessary spacing at their lowermost ends.

The combined elements of the leg connecting unit 14 not only function to attach the legs 12 and 13 to the cross member 11 in such a manner as to provide the requisite strength to the trestle 10, but further allow the legs 12 and 13 to be folded into parallel, side-by-side relation with the cross member 11 for storage purposes. This additional function is shown in Fig. 3 and it will be noted that the leg holding members 22 in their leg folding position are received upon the opposite top surfaces of the horizontal plate 20 extending outwardly of the side plates 17. To bring this about, the lever 33 is threadedly retracted toward the end of the bolt 31 to an extent that each of the leg holding members 22 and their associated legs can be moved outwardly so as to disengage the tongues 25 from the slots 18 and the side flanges 24 and legs from the grooves 21. The bolt 31 is of sufficient length so as to eliminate the necessity of completely removing the lever 33 and thus maintain all of the cooperating elements in assembled relation. Once the leg holding members 22 and their associated legs 12 and 13 are free of the slots 18 and grooves 21, they are pivoted or rotated about the bolt 31 to bring the legs 12 and 13 up into side-by-side, parallel relation with the cross member 11 as shown in Fig. 3. Once this positioning has been attained the leg holding members 22 and associated legs 12 and 13 are moved along the bolt 31 inwardly toward adjacent side plates 17 to an extent that the outer surfaces of the lowermost side flanges 24 rest on the top surface of the horizontal plate 20 inwardly of the grooves 21. Still further, the tongues 25 clear the end surfaces of the side plates 17 and upon threaded advancement of the lever 33 along the bolt 31, the leg holding members 22 and associated legs 12 and 13 are moved inwardly into contact with the outer surfaces of adjacent side plates 17. Continued advancing of the lever 33 tightens the entire assembly in its folded or collapsed condition and prevents inadvertent displacement of the legs 12 and 13 out of side-by-side, parallel relation with the cross member 11. In this manner the legs 12 and 13 are completely supported in their folded condition and the trestle 10 is readily storable. In order to erect the trestle 10 from its collapsed storable condition, the foregoing procedure is reversed and the leg holding members 22 and associated legs 12 and 13 are moved again into their positions illustrated in Fig. 2.

From the foregoing it will be appreciated that the outwardly extending portions of the horizontal plate 20 and the tongues 25 additionally function to prevent displacement of the legs 12 and 13 when the same are moved into parallel, side-by-side relation with the cross member 11. The effective length of the horizontal plate 20 is such that the legs 12 and 13 and associated leg holding members 20 are braced against further clockwise or counterclockwise movement about the bolt 31 when the same are moved into the position shown in Fig. 3. The tongues in overlapped relation with the end surfaces of the side plates 17 also strengthen this arrangement to prevent inadvertent displacement of the legs 12 and 13. In the folded condition the effective length of each of the tongues 25 may be such as shown in Fig. 3 to cause the same to become imbedded in the material of the cross member 11 when folded and forceably clamped by the cooperating bolt 31 and lever 33 if the cross member 11 extends beyond the end of the channel member 15.

While in the drawings the dimensions of the cross member 11 and legs 12 and 13 are such that the interior of the channel member 15 is completely filled and the leg holding members 22 are completely filled, it should be appreciated that this is merely a preferred arrangement. The cross member 11 may be of smaller dimensions than the interior of the channel member 15 and the legs 12 and 13 may be of greater or lesser thickness than the side flanges 24. Thus if the legs 12 and 13 are of greater thickness than their associated side flanges 24, it is necessary merely to provide the tongues 25 with sufficient length so as to be received within their associated slots 18. The material of the legs 12 and 13 can fill the grooves 21 without the side flanges 24 being received therein and still provide the same desirable results as previously described.

Obviously many modifications and variations of the invention as hereinbefore set forth may be made without departing from the spirit and scope thereof, and therefore only such limitations should be imposed as are indicated in the appended claims.

I claim:

1. In a foldable trestle formed from a cross member supported by separate depending legs, the provision of a leg connecting unit including an upwardly opening channel shaped member in which a portion of said cross member is received, leg holding and positioning members attached to each side of said channel shaped member, said leg holding and positioning members being adjustably held in substantially vertical relation to said channel shaped member in the erected condition of said trestle and in substantially horizontal relation to said channel shaped member in the folded condition of said trestle by adjustable clamping means interconnecting all of said members and legs, and vertically spaced slot and grooved locking means forming a part of said channel shaped member on each side thereof, said leg holding and positioning members including inwardly directed slot engaging means at the top thereof which when received in said slot means upon erection of said trestle in combination with the receiving of said legs in associated grooved locking means prevent movement of said legs relative to said cross member, said slot and slot engaging means being positioned above said adjustable clamping means and said grooved locking means being positioned below said adjustable clamping means.

2. In a foldable trestle formed from a cross member supported by separate depending legs, the provision of a leg connecting unit including a channel shaped member formed from a horizontal bottom plate connected to spaced upstanding side plates each having a transverse slot near the top margin thereof, opposite side portions of said bottom plate extending outwardly beyond said side plates and defining oppositely directed horizontal flanges, each of said flanges having a centrally recessed portion defining a grooved locking means opening outwardly along the free end margin thereof, said channel shaped member receiving a portion of said cross member therein between said side plates, leg holding and positioning members associated with each side plate of said channel shaped member, said leg holding and positioning members being adjustably held in substantially vertical relation to said channel shaped member in the erected condition of said trestle and in substantially horizontal relation to said channel shaped member in the folded condition of said trestle by adjustable clamping means interconnecting all of said members and legs, said leg holding and positioning members including inwardly directed tongue-like slot engaging means at the top thereof which when received in said slots upon erection of said trestle in combination with the receiving of said legs within an associated grooved locking means prevent movement of said legs relative to said cross member.

3. In a foldable trestle formed from a cross member supported by separate depending legs, the provision of a leg connecting unit including a channel shaped member formed from a horizontal bottom plate connected to spaced upstanding side plates each having a transverse slot near the top margin thereof, opposite side portions of said bottom plate extending outwardly beyond said side plates and defining oppositely directed horizontal flanges, each of said flanges having a centrally recessed portion defining a grooved locking means opening outwardly along the free end margin thereof, said channel shaped member receiving a portion of said cross member therein between said side plates, a trestle leg connecting plate associated with each side plate of said channel shaped member, each of said leg connecting plates being channel shaped with opposite inwardly turned marginal flange portions between which a leg is received, the top marginal edge of each leg connecting plate being provided with an inwardly turned integral tongue receivable in the slot of its associated side plate in the erected condition of said trestle, the grooved locking means of each of said flanges receiving a portion of a leg and associated marginal flange portions of its leg connecting plate therein to cooperatively hold the leg with the associated engaged tongue and slot in depending relation to said cross member when said trestle is in its erected condition, and adjustable tightening means extending transversely through said leg connecting unit and cross member and legs associated therewith.

4. In a foldable trestle formed from a cross member supported by separate depending legs, the provision of a leg connecting unit including a channel shaped member formed from a horizontal bottom plate connected to spaced upstanding side plates each having a transverse slot near the top margin thereof, opposite side portions of said bottom plate extending outwardly beyond said side plates and defining oppositely directed horizontal flanges, each of said flanges having a centrally recessed portion defining a grooved locking means opening outwardly along the free end margin thereof, said channel shaped member receiving a portion of said cross member therein between said side plates, a trestle leg connecting plate associated with each side plate of said channel shaped member, each of said leg connecting plates being channel shaped with opposite inwardly turned marginal flange portions between which a leg is received, the top marginal edge of each leg connecting plate being provided with an inwardly turned integral tongue receivable in the slot of its associated side plate in the erected condition of said trestle, the grooved locking means of each of said flanges receiving a portion of a leg and associated marginal flange portions of its leg connecting plate therein to cooperatively hold the leg with the associated engaged tongue and slot in depending relation to said cross member when said trestle is in its erected condition, and adjustable tightening means extending transversely through said leg connecting unit and the cross member and legs associated therewith, said adjustable tightening means being in the form of a bolt having a threaded end portion about which is advancingly received a connecting unit tightening lever, the outer surface of each leg connecting plate being provided with a boss cooperatively defining a vertical plane in which said adjustable tightening means are operative.

References Cited in the file of this patent

UNITED STATES PATENTS

| | | |
|---|---|---|
| 318,896 | Hanssen | May 26, 1885 |
| 1,656,558 | Dysinger | Jan. 17, 1928 |
| 2,105,979 | Manley | Jan. 18, 1938 |
| 2,112,778 | Kacena | Mar. 29, 1938 |
| 2,506,896 | Shakowitz | May 9, 1950 |
| 2,555,503 | Morton | June 5, 1951 |
| 2,650,140 | Boitos | Aug. 25, 1953 |
| 2,803,502 | Ellinger | Aug. 20, 1957 |